UNITED STATES PATENT OFFICE.

GASTON PHILIPPE GUIGNARD, OF MELUN, AND HENRI LOUIS ADOLPHE MARIE WATRIGANT, OF LILLE, FRANCE.

PROCESS FOR EXTRACTING GLYCERIN FROM VINASSES.

1,078,580.

Specification of Letters Patent. Patented Nov. 11, 1913.

No Drawing. Application filed September 7, 1912. Serial No. 719,140.

*To all whom it may concern:*

Be it known that we, GASTON PHILIPPE GUIGNARD and HENRI LOUIS ADOLPHE MARIE WATRIGANT, both citizens of the Republic of France, and residing, respectively, at Avenue des Marronniers, Melun, Seine-et-Marne, and at 80 Quai de la Basse Deule, Lille, Nord, France, have invented a new and useful Process for Extracting Glycerin from Vinasses, of which the following is a specification.

The processes for extracting the glycerin contained in distillery vinasses, based upon the methodical washing of the more or less dried vinasses, all present disadvantages. For if the vinasses are not absolutely dry, the glycerin-solvent becomes hydrated and dissolves substances which would be insoluble in the anhydrous solvent. On the other hand, the glycerin which dissolves in the solvent is itself a solvent of numerous metallic salts. The glycerin obtained under these conditions is not pure and it must be subjected to a process of rectification; this rectification, conducted in presence of metallic salts, involves the destruction of a portion of the glycerin recovered. The only process based upon these ideas and at present capable of yielding glycerin free from impurities rests upon the complete desiccation of the vinasses and the use of absolute alcohol. This process forms the subject of our copending application Serial No. 630,206, filed May 29th, 1911. However, the conditions of this process, though possible in practice, are comparatively difficult to carry out.

The present invention relates to a process for extracting the glycerin, which forms actually an analytical method and rests upon the following bases: (1) Desiccation of the vinasses as far as possible without it being necessary that this desiccation be complete. (2) Washing of the residue with various liquids in which glycerin is insoluble under the conditions of the operation, in order to separate the substances which would dissolve in alcohol at the same time as the glycerin. (3) Washing of the residues of the previous washings, with hot amyl alcohol with heat, in order to dissolve the glycerin.

Glycerin is very soluble in hot amyl alcohol but is insoluble or very slightly soluble in cold amyl alcohol; it is, therefore, only necessary to cool the amyl solution in order to separate the two liquids and to obtain by decantation on the one hand glycerin and on the other hand amyl alcohol which is thus recovered for reuse in the process.

The following description will explain the method of operation which forms the application of the principle of the invention to the treatment of vinasses from molasses and from grain.

I. *Treatment of vinasses from molasses.*

(*a*) To the molasses-vinasses there is added a small quantity of tannin or of a solution of tannic extract which precipitates the nitrogenous substances of an albuminoid or peptonic nature. The precipitate is collected and dried. This first separation renders the further desiccation easier.

(*b*) To the liquid resulting from this separation there is added ferric hydrate $Fe_2(OH)_6$ or ferric chlorid $Fe_2Cl_6$, and the liquid is then rendered alkaline by means of lime $Ca(OH)_2$. The excess of lime is neutralized either by carbonic acid gas obtained from the vats or by a small quantity of sodium carbonate $Na_2CO_3$. There is obtained a precipitate which contains certain organic acids, in particular succinic acid $C_4H_6O_4$.

(*c*) The liquid separated from the second precipitate is evaporated to dryness, first in the known regenerative or multiple-effect apparatus, and lastly in the apparatus which forms the subject of the Letters Patent No. 1,036,486, granted August 20, 1912.

(*d*) The dry residue which contains the remainder of the solid substances constituting the vinasses is submitted to the following systematic washings:—($d^1$) Washing while cold with acetone which dissolves the malate of potassium; the acetone is separated by distillation to return into the operation. The potassium malate is also separated and there are extracted therefrom malic acid and potassium salts, or else by calcination in a closed retort potassium carbonate and various volatile products. ($d^2$) The washing with acetone leaves a residue which is subjected while hot or cold, to a methodical washing with ethyl acetate. This solvent removes various unfermented glucoses such as raffinose at the same time as betaïne; these products may be separated by fractional crystallization, if necessary. ($d^3$) The solid residue of the washing with ethyl acetate is washed while heated with hot amyl alcohol which dissolves only the glycerin. The amyl solution of gylcerin when cooled separates into two liquids:— (1) gylcerin, (2) amyl alcohol saturated when cold with glycerin, and which may be recovered for reuse in the process.

The washing with hot amyl alcohol could not be effected upon the whole of the vinasses, because the potassium malate and the betaïne would also be dissolved at the same time as the glycerin. On the other hand, a first modification of the process according to the present invention, consists in washing the whole of the vinasses with cold amyl alcohol saturated with glycerin. This washing removes the potassium malate and the betaïne without dissolving any more glycerin, and replaces the operations $d^1$ and $d^2$ previously described; by following this cold washing by a hot washing with hot amyl alcohol, the glycerin alone is removed and can be separated from the alcohol by cooling.

A second modification of the process consists in washing the dry residue resulting from the operation with ethyl acetate, which removes at the same time the potassium malate, the unfermented glucose and the betaïne. Distillation of the solution yields the solvent and a mixture of solid substances which are separated by crystallization.

II. Treatment of grain-vinasses.

Two cases may be considered:
1. The whole of the vinasses are treated.
2. The vinasses are divided by decantation into a solid portion and a liquid portion.

*1. Treatment of the whole of the vinasses.*—The vinasses are neutralized with carbonate of lime and conveyed to the evaporating apparatus. The dry residue is subjected successively to:—(a) a methodical washing with acetone which removes the fatty matter; in place of acetone, there may be employed carbon tetrachlorid, benzin, etc. It is absolutely necessary to remove the fatty matter before dissolving the glycerin with amyl alcohol, because the fatty substances are also soluble in amyl alcohol, and because the absolute solubility of fatty matter and of glycerin in amyl alcohol diminishes when fatty matter and glycerin are present. (b) A methodical washing in hot amyl alcohol which dissolves the glycerin, the latter being separated by cooling.

*2. Treatment of decanted vinasses.*—The solid portion is used as suits the distiller. The liquid portion, at present lost and wasted in the residual liquor, may with advantage be treated as follows:—The vinasses are neutralized with ferric hydrate and carbonate of lime. There is obtained a precipitate of succinate of iron from which succinic acid may be extracted. The liquid, which may or may not be separated from the precipitate, is evaporated to dryness and subjected to hot washing with hot amyl alcohol in order to recover the glycerin. It is to be noted that the fatty matter remains in the solid portion, which renders it useless to effect a preliminary washing with a solvent of fatty matter. The glycerin is separated from the amyl alcohol by cooling.

The solid residue of the washing with amyl alcohol is composed of lactate of lime, nitrogenous matter, phosphates, and potassium salts, and forms an excellent manure.

What we claim and desire to secure by Letters Patent of the United States is:—

A process for extracting glycerin from vinasses which comprises desiccating the vinasses, washing the residue with liquid in which glycerin is insoluble under the conditions of the operation, but capable of dissolving substances which would dissolve in amyl alcohol together with the glycerin, then washing the residue of these washings in hot amyl alcohol to dissolve the glycerin alone, and then cooling the amyl alcohol to separate the glycerin therefrom.

In testimony whereof we have signed our names to this specification, in the presence of two subscribing witnesses.

GASTON PHILIPPE GUIGNARD.
HENRI LOUIS ADOLPHE MARIE WATRIGANT.

Witnesses.
H. C. COXE,
LÉON PEILLET.